United States Patent Office 3,141,871
Patented July 21, 1964

3,141,871
PROCESS FOR THE POLYMERIZATION OF PER-HALOGENATED OLEFINES BY USE OF PROMOTERS BASED ON INORGANIC PEROXIDES
Mario Ragazzini and Franco Gozzo, Milan, Italy, assignors, by mesne assignments, to Edison, Milan, Italy, a corporation of Italy
No Drawing. Filed Apr. 16, 1962, Ser. No. 187,912
Claims priority, application Italy Apr. 27, 1961
7 Claims. (Cl. 260—92.1)

The present invention relates to a process for the polymerization of per-halogenated olefines, such as for instance monochlorotrifluoroethylene, employing as an initiator of polymerization, an inorganic peroxide of the type $X_2O_2$, where X represents in equivalents hydrogen or an alkali or alkaline-earth metal.

It is known that fluoroethylenes are generally polymerized, employing, as initiators for polymerization, organic peroxides such as for instance benzoyl peroxide or inorganic peroxides, normally persulfate, used alone as well as in redox systems.

Generally as a reaction medium there is employed a halogenated hydrocarbon or water, resorting to the former in the case in which the normal organic peroxides or haloalkyl or acyl peroxides are used as promoters, and to the latter in the case of inorganic peroxides or of redox systems.

The products of reaction may comprise oils, waxes or solids according to the molecular weight and to the average degree of polymerization of the polymer obtained.

In general when operating with inorganic peroxides or with redox systems in aqueous medium it is necessary to conduct the polymerization at temperatures higher than 50° C. to obtain conversions and yields of polymer of sensible magnitude.

The polymers obtained under such conditions however are generally of low molecular weight; they show N.S.T. ("No Strength Temperature") values lower than 150° C. and the products after fusion are extremely fragile.

To obtain polymers with high thermal and mechanical characteristics it is necessary to conduct the polymerization tests at temperatures in the neighborhood of 0° C.

Under those conditions the speed of polymerization is generally slow, while the "chain transfer" reactions diminish considerably.

The methods normally used then resort to particular organic peroxides having low decomposition temperature; among these, the chloro- and the fluoro-acyl peroxides employed in a reaction medium constituted by a halogenated (generally fluorinated) hydrocarbon proved to be the most adapted for the purpose.

In the case in which redox systems or inorganic peroxides are employed as polymerization catalysts in aqueous medium, the velocity of formation of radicals is so slow that recourse must be made to particular activators such as for instance metal salts, of metals having variable valency.

So in French Patent No. 1,141,163, trifluorochloroethylene is polymerized at room temperature in aqueous suspension, by a redox system using an active promoting agent of the type $FeF_6^{---}$. Equally in German Patent No. 959,060 the monochlorotrifluoroethylene is polymerized with a redox system, in the presence of potassium phosphate and ferrous sulfate as activators and of malonic acid and NaOH as emulsifiers and stabilizers.

Other patents report the possibility of conducting polymerization tests at temperatures slightly higher than 0° C., using particular catalytic systems based on inorganic peroxides or operating under particular conditions; so for instance there has been considered the possibility of polymerizing monochlorotrifluoroethylene in aqueous medium by a redox system in the presence of perfluorooctanoic acid, neutralizing the solution by an alkali, or of polymerizing monochlorotrifluoroethylene, at a temperature of about 0° C., using as a promoter in a system of mass polymerization, anhydrous $H_2O_2$ or $H_2O_2$ with only traces of water.

In the process according to the invention, per-halogenated olefines, in particular monochlorotrifluoroethylene, are polymerized with excellent quantitative and qualitative yield, at temperatures lower than 40° C., without any need for addition of any reducing substances, of salts of metals having variable valency or of particular activators, using as a promoter of polymerization at least one inorganic peroxide of the type $X_2O_2$, where X represented in hydrogen equivalents an alkali metal or an alkaline-earth metal, introduced into the reaction medium constituted by at least one substance having polar character having pH≥7 in the presence of the monomer to be polymerized.

As a reaction medium there is normally employed water, or aqueous solutions with alkaline or buffer character, but also other substances with polar character alone or in admixture.

The pH of the medium should be higher than 7 at the time of starting the polymerization. In fact it has been found that in polymerizing monochlorotrifluoroethylene in aqueous medium with a ratio by weight of monochlorotrifluoroethylene to water of 1:1, using as a promoter of polymerization $H_2O_2$ alone, there is no formation of polymer, or only traces. However, it suffices to add some drops of soda to the solution and the polymerization begins.

Moreover it has proved to be particularly advantageous to effect the dissolution of the alkali peroxide in water in the presence of the monomer. In fact by adding peroxide of sodium dissolved in cold water to the monochlorotrifluoroethylene one observes the decomposition of the peroxide, but however at the end of the test one obtains only traces of the polymer.

If, vice versa, the addition of the peroxide to the water is effected in the presence of the monochlorotrifluoroethylene to be polymerized, the yields of polymonochlorotrifluoroethylene at the end of the reaction result in the order of 100 g. per g. of $Na_2O_2$.

In relation to the yield and to the characteristics of the polymer also the temperature is important at which the decomposition of the peroxide takes place and at which the polymerization begins.

In general it is convenient to operate in an interval as narrow as possible between 0° C. and +10° C.

Under these conditions the formation of the peroxides of the perhalogenated olefines takes place, which then in decomposing are supposed to act as true promoters of the polymerization.

That is confirmed by the fact that, as seen, the polymerization proceeds much better if the decomposition of the peroxide is effected in the presence of the olefine.

The effect of the alkali present might just be that of favouring the dehalogenation of the monomer and the subsequent oxidation thereof.

It can be experimentally ascertained that by conducting the polymerization with sodium peroxide in aqueous solutions with 1% of NaOH, with a ratio by weight of $H_2O$/monochlorotrifluoroethylene equal to 1, the aqueous solution appears at the end of the reaction (about 10 hours) neutral in practice, while the sodium itself is bonded as NaF and NaCl.

It has been found, moreover, in the course of the tests that led to the present invention, what influence the reaction medium has upon the molecular weight and upon the characteristics of the polymer.

For instance, using as a reaction medium water or alkaline solutions and as a promoter sodium peroxide, it is possible to adjust the molecular weight of the polymonochlorotrifluoroethylene and its softening point by adjusting the amount of water employed.

So by passing from polymerization reactions conducted with sodium peroxide and traces of water to reactions wherein the ratio by weight $H_2O$/g. of monomer is equal to 1, it is possible to vary the molecular weight of the polymer from low to high values and correspondingly to obtain products the softening point of which is related to the quantity of water employed during the polymerization.

In the polymerization reactions according to the present invention it is also possible to employ, but not necessarily, the conventional emulsifying agents, without any need of resorting to special agents, difficult to be obtained, such as those described in some earlier patents.

The polymer that is obtained is generally of high purity, and can be further purified by washing or extracting in boiling alcohol. Operating that way one obtains products which by fusion give laminae of good transparency.

Example 1

Into an autoclave with electromagnetic stirring of 5 litres' capacity, of stainless steel, whose temperature is kept constant at 10° C. by means of a bath of water and ice, there is introduced a flame-sealed phial containing 15 g. of sodium peroxide. Then the autoclave is closed and under vacuum 1500 g. of deionized water are charged which was deionized, de-aerated and cooled down to 1–2° C., and 3000 g. of monochlorotrifluoroethylene are charged.

Then the autoclave is put in agitation in such a manner that the phial containing the peroxide breaks. After 12 hours of stirring at a temperature of about 5 to 10° C., 400 g. of polymer having a N.S.T. value in the surroundings of 300° C. are discharged. At the end of the test the pH of the liquid appears to be slightly acid.

If the sodium peroxide is instead introduced into the autoclave already dissolved in water cooled down to 2–3° C. and then the monochlorotrifluoroethylene is introduced, and the reaction is carried out for a length of time analogous to the preceding one there are obtained only traces of polymer dispersed in the liquid phase.

Example 2

Into a shaking autoclave of 1 litre capacity, of stainless steel, whose temperature is kept constant at 10° C. by means of a bath of water and ice, there is introduced a flame-sealed phial containing 3 g. of sodium peroxide. Then the autoclave is closed and under vacuum there are charged 300 g. of a solution of 1% sodium hydroxide cooled down to 1–2° C. and 300 g. of monochlorotrifluoroethylene.

Then the autoclave is put in agitation in such a way that the phial containing the peroxide breaks. After 12 hours of stirring at a temperature of about 5° C., 150 g. of polymer having a N.S.T. value of about 300° C. are discharged.

At the end of the test the pH of the liquid appears to be practically neutral.

The polymer having the N.S.T. value of 300° C. is subjected to extraction with ethyl alcohol in such a manner as to eliminate the low molecular weights and to increase the purity of the product. The material so extracted has given laminae of high degree of transparency.

If instead the sodium peroxide is introduced into the autoclave already dissolved in water cooled down to 2–3° C. and then the monochlorofluoroethylene is introduced, and the reaction is conducted for a length of time analogous to the preceding one, there are obtained only traces of polymer dispersed in the liquid phase.

Example 3

Into a shaking autoclave of 1 litre capacity, of stainless steel, whose temperature is kept constant at 10° C. by means of a bath of water and ice, there are introduced under vacuum 300 g. of a 1% sodium hydroxide solution cooled down to 1–2° C., 3.2 ml. of 35% hydrogen peroxide and 600 g. of monochlorotrifluoroethylene.

Then the autoclave is put in agitation and after 12 hours' time there are discharged 150 g. of polymer having a N.S.T. value of about 300° C.

If operating instead as above described, but without sodium hydroxide, no traces of polymer are noted.

Example 4

Into a shaking autoclave of 1 litre capacity, of stainless steel, whose temperature is kept constant at 10° C. by means of a bath of water and ice, there is introduced a flame-sealed phial containing 3 g. of sodium peroxide. Then the autoclave is closed and under vacuum there are charged 5 g. of water and 600 g. of monochlorotrifluoroethylene. Then the autoclave is put in agitation in such a way that the phial containing the peroxide breaks. After 12 hours' stirring at about 5° C. there are discharged 250 g. of polymer having softening point about 150° C.

Example 5

Into a shaking autoclave of 1 litre capacity, of stainless steel, whose temperature is kept constant at 10° C. by means of a bath of water and ice, there is introduced a flame-sealed phial containing 3 g. of sodium peroxide. Then the autoclave is closed and under vacuum there are charged 10 g. of water and 600 g. of monochlorotrifluoroethylene.

Then the autoclave is put in agitation in such a way that the phial containing the peroxide breaks. After 12 hours agitation at about 5° C. there are discharged 230 g. of polymer having a softening point around 170° C.

Proceeding with analogous tests wherein the quantity of water is gradually increased up to a ratio by weight of water to monochlorotrifluoroethylene=1, the softening point of the polymer rises gradually up to a value of N.S.T. of the order of 300° C.

We claim:

1. A process for the homopolymerization of monochlorotrifluoroethylene monomer which comprises homopolymerizing the monomer at a temperature between 0° and 40° C. in the presence of a promoter of the type $X_2O_2$, where X is selected from the group consisting of hydrogen, alkali metals and alkaline earth metals, and in a completely aqueous reaction medium having a pH, at the time of starting the homopolymerization, greater than 7, the promoter being added to the reaction medium in the presence of the monomer which is to be homopolymerized.

2. A process according to claim 1 wherein the promoter is selected from the group consisting of sodium peroxide, potassium peroxide, calcium peroxide, and hydrogen peroxide.

3. A process according to claim 1, wherein the reaction medium is water.

4. A process according to claim 1, wherein the reaction medium is an aqueous alkaline solution.

5. A process according to claim 1, wherein the reaction medium is a buffer solution.

6. A process according to claim 1, wherein the promoter is added after the reaction medium and the monomer have been introduced to one another, and dissolved in the reaction medium.

7. A process according to claim 6, wherein the monomer and the reaction medium are introduced to one another under vacuum, and the promoter is dissolved in the reaction medium at a temperature between 0° and 10° C.

References Cited in the file of this patent
UNITED STATES PATENTS

| | | |
|---|---|---|
| 1,756,943 | Frankenburger et al. | May 6, 1930 |
| 2,055,468 | Douglas | Sept. 29, 1936 |
| 2,559,752 | Berry | July 10, 1951 |
| 2,766,215 | Stoops et al. | Oct. 9, 1956 |
| 2,888,446 | Herbst et al. | May 26, 1959 |
| 2,970,988 | Lo | Feb. 7, 1961 |
| 3,024,224 | Herbst et al. | Mar. 6, 1962 |